United States Patent [19]
Rea et al.

[11] Patent Number: 5,573,279
[45] Date of Patent: Nov. 12, 1996

[54] QUICK CONNECT COUPLING

[75] Inventors: Perry J. Rea, Bloomfield Hills; Michael R. Miller, Rochester Hills; Dennis G. Kinder, Clarkston; Christopher J. Kargula, Sterling Heights; William E. Stevens, Ypsilanti, all of Mich.

[73] Assignee: Form Rite Corporation, Auburn Hills, Mich.

[21] Appl. No.: 471,905

[22] Filed: Jun. 7, 1995

Related U.S. Application Data

[63] Continuation-in-part of Ser. No. 176,243, Jan. 3, 1994, Pat. No. 5,462,313.

[51] Int. Cl.⁶ ............................................... F16L 21/08
[52] U.S. Cl. ...................... 285/21.1; 285/21.3; 285/319; 285/379; 285/423; 285/921; 285/910
[58] Field of Search ................................ 285/319, 921, 285/910, 374, 231, 53, 379, 423, 110, 21.1, 21.3; 156/158

[56] References Cited

U.S. PATENT DOCUMENTS

| | | |
|---|---|---|
| 1,029,715 | 6/1912 | Robinson . |
| 3,312,483 | 4/1967 | Leadbetter et al. .................. 285/340 |
| 3,413,021 | 11/1968 | Potts ..................................... 285/319 |
| 3,450,424 | 6/1969 | Calisher ................................ 285/305 |
| 3,569,903 | 3/1971 | Brishka ................................... 339/74 |
| 3,583,731 | 6/1971 | Jewell ..................................... 285/85 |
| 3,584,902 | 6/1971 | Vyse ..................................... 285/305 |
| 3,588,149 | 6/1971 | Demler, Sr. et al. ................. 285/110 |
| 3,601,361 | 8/1971 | Hundhausen et al. ............. 251/149.1 |
| 3,711,125 | 1/1973 | Dehar ..................................... 285/111 |
| 3,826,523 | 7/1974 | Eschbaugh .............................. 285/39 |
| 3,839,093 | 10/1974 | Twogood et al. .................... 136/135 R |
| 3,888,523 | 6/1975 | Bartholomew ...................... 285/382 |
| 3,997,195 | 12/1976 | Bartholomew ........................ 285/81 |
| 4,006,922 | 2/1977 | Bartholomew ........................ 285/39 |
| 4,173,362 | 11/1979 | Glover et al. ........................ 285/110 |
| 4,310,185 | 1/1982 | Bartholomew ...................... 285/369 |
| 4,423,892 | 1/1984 | Bartholomew ...................... 285/319 |
| 4,524,995 | 6/1985 | Bartholomew ........................ 285/54 |
| 4,526,411 | 7/1985 | Bartholomew ...................... 285/305 |
| 4,541,658 | 9/1985 | Bartholomew ...................... 285/319 |
| 4,601,497 | 7/1986 | Bartholomew ...................... 285/319 |
| 4,669,757 | 6/1987 | Bartholomew ........................ 285/55 |
| 4,681,351 | 7/1987 | Bartholomew ...................... 285/319 |
| 4,743,051 | 5/1988 | Proni ..................................... 285/319 |
| 4,749,214 | 6/1988 | Hoskins et al. ......................... 285/4 |
| 4,778,203 | 10/1988 | Bartholomew ...................... 285/111 |
| 4,790,569 | 12/1988 | Chaffee .................................. 285/40 |

(List continued on next page.)

FOREIGN PATENT DOCUMENTS 2032560  5/1980  United Kingdom .

*Primary Examiner*—Dave W. Arola
*Attorney, Agent, or Firm*—Howard & Howard

[57] ABSTRACT

A quick connect coupling for tubing. The coupling includes a tubular male connector member adapted to be telescopically received within a tubular female connector member assembly. The female assembly includes a first member defining a seal bore and a cylindrical socket portion forwardly of the seal bore. A second female member includes a cylindrical portion which plugs into the socket of the first member and is held in position relative to the first member by sonic welding. A plurality of circumferentially spaced feet on the inner end of the second member are positioned proximate the seal to hold the seal in the seal bore and further engage the outer periphery of the pilot portion of the male member to minimize cocking of the male member relative to the female assembly. The second member also includes a plurality of circumferentially spaced resilient finger portions which snap into position in engagement with the rear annular face of the bead of the male member as the front annular face of the bead seats against the feet portions of the second member. The seal includes an annular main body portion, a plurality of axially spaced annular internal rib portions for sealing engagement with the pilot portion of the male member, and a plurality of axially spaced external rib portions providing an interference fit of the seal in the seal bore.

28 Claims, 3 Drawing Sheet

U.S. PATENT DOCUMENTS

| | | | |
|---|---|---|---|
| 4,869,534 | 9/1989 | Ketcham et al. | 285/24 |
| 4,915,136 | 4/1990 | Bartholomew | 138/89 |
| 4,925,217 | 5/1990 | Ketcham | 285/93 |
| 4,927,185 | 5/1990 | McNaughton | 285/39 |
| 4,936,544 | 6/1990 | Bartholomew | 251/149.6 |
| 4,943,091 | 7/1990 | Bartholomew | 285/12 |
| 4,944,536 | 7/1990 | Bartholomew | 285/319 |
| 4,948,175 | 8/1990 | Bartholomew | 285/39 |
| 4,948,176 | 8/1990 | Bartholomew | 285/93 |
| 4,979,765 | 12/1990 | Bartholomew | 285/93 |
| 4,981,586 | 1/1991 | Bartholomew | 210/435 |
| 4,984,831 | 1/1991 | Bengtsson | 285/379 |
| 5,000,614 | 3/1991 | Walker et al. | 403/326 |
| 5,002,315 | 3/1991 | Bartholomew | 285/93 |
| 5,009,454 | 4/1991 | Bartholomew | 285/24 |
| 5,031,941 | 7/1991 | Bartholomew | 285/91 |
| 5,033,513 | 7/1991 | Bartholomew | 138/109 |
| 5,052,723 | 10/1991 | Bartholomew | 285/108 |
| 5,063,968 | 11/1991 | Bartholomew | 138/109 |
| 5,067,754 | 11/1991 | Bartholomew | 285/319 |
| 5,069,489 | 12/1991 | Bartholomew | 285/319 |
| 5,125,431 | 6/1992 | Vogel et al. | 137/561 A |
| 5,285,776 | 2/1994 | Bertram | 128/207.14 s |

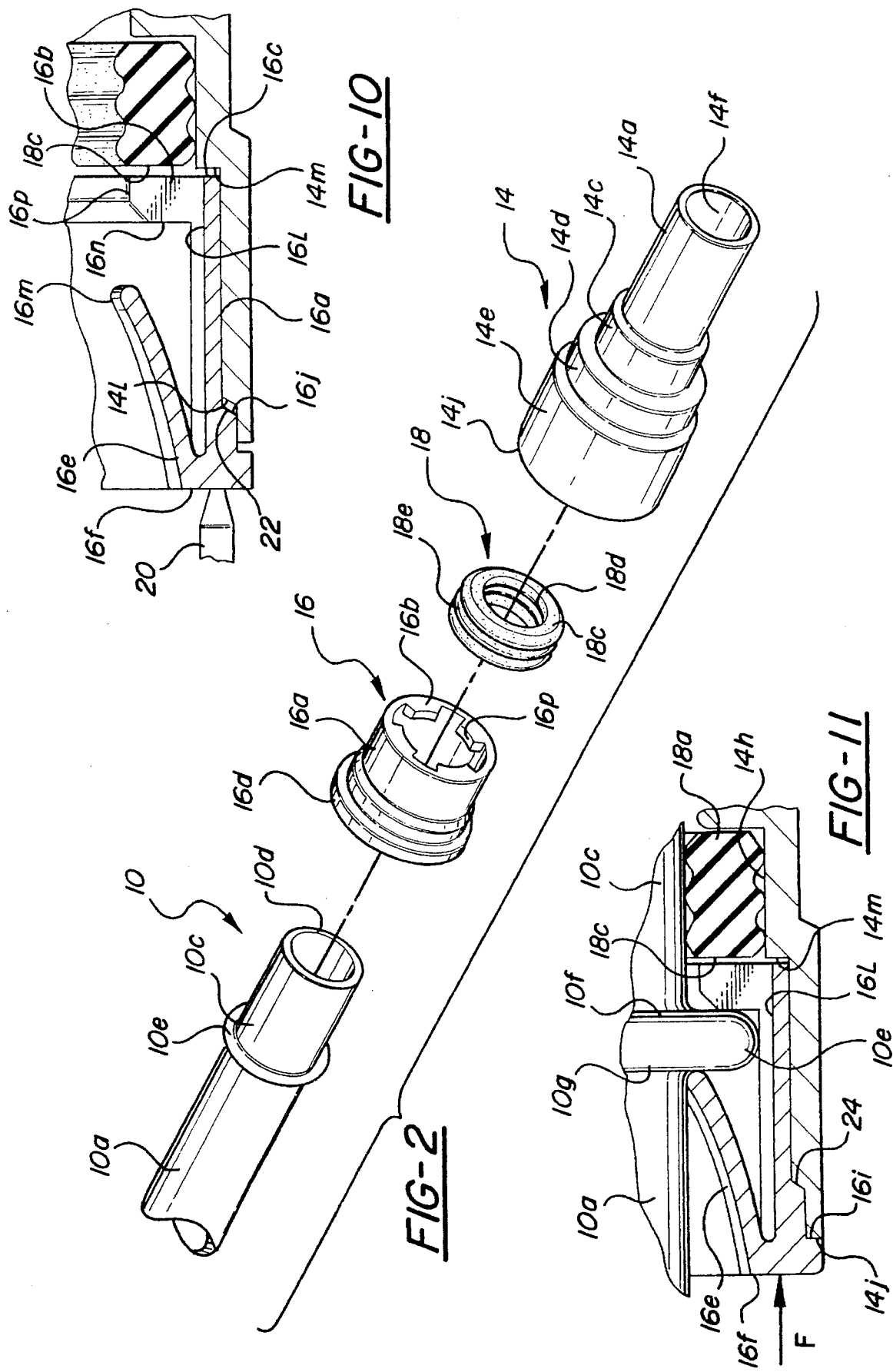

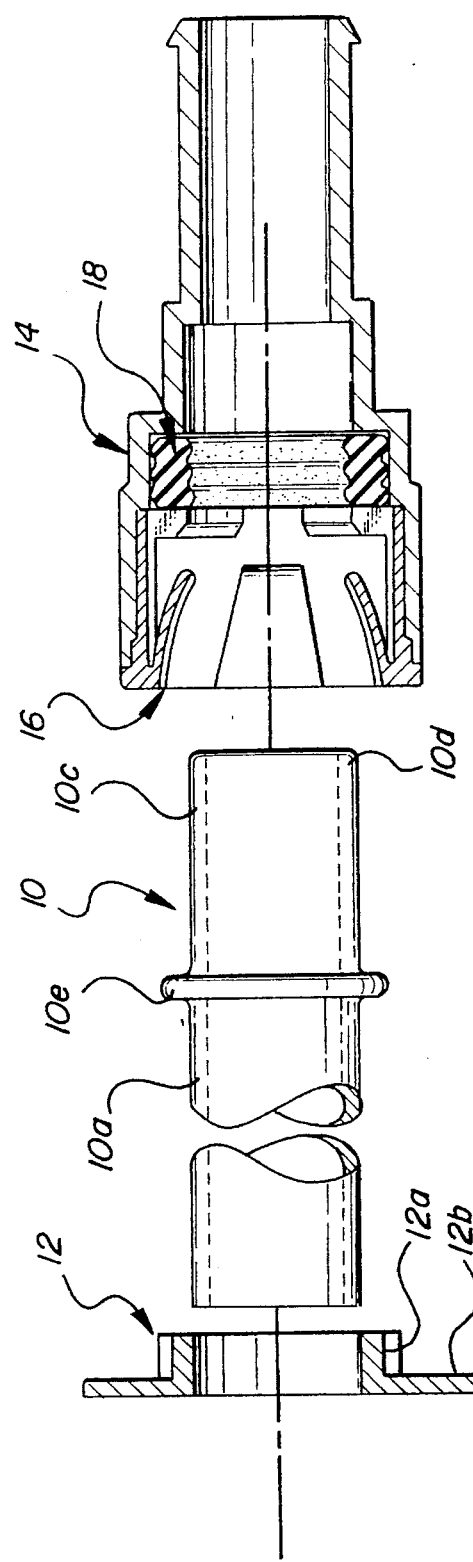
FIG-3
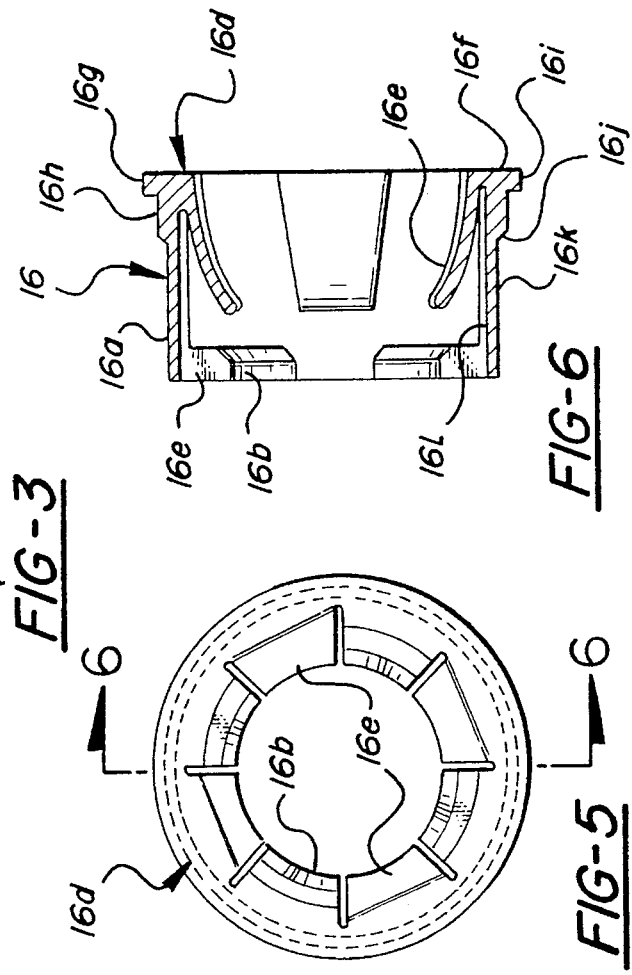
FIG-6
FIG-5
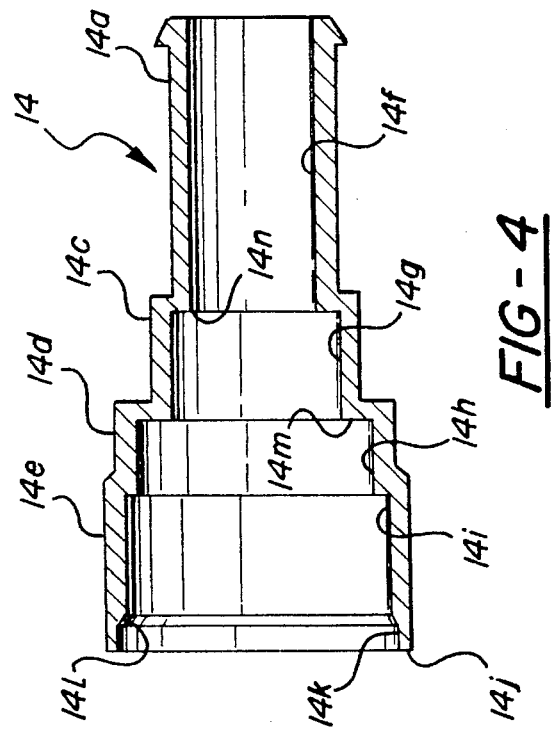
FIG-4

5,573,279

QUICK CONNECT COUPLING

REFERENCE TO RELATED APPLICATIONS

This application is a continuation-in-part of U.S. patent application Ser. No. 08/176,243 filed on Jan. 3, 1994, now U.S. Pat. No. 5,462,313, issued Oct. 31, 1995.

FIELD OF THE INVENTION

This invention relates to a quick connect coupling for readily releasably connecting tubing elements.

BACKGROUND OF THE INVENTION

In systems utilizing conduits for transporting fluids, it is both necessary and desirable to provide for the rapid connection and disconnection of sections of such conduits. A good example is the hydraulic system of a motor vehicle which incorporates a large number of both rigid and flexible tubing elements which must reliably convey hydraulic fluid under pressure to ensure effective cooling of transmission and engine components.

Quick connectors for this type of tubing are well known. U.S. Pat. No. 3,584,902 issued to Vysa teaches the interconnection of tubing elements utilizing a removable spring clip assembly. Traditionally quick connect assemblies have utilized an internal locking element which engages both a male member and female member, as is shown by U.S. Pat. No. 3,569,903 issued to Brishka. These quick connect devices typically incorporate one or more O-ring seals such as those found in U.S. Pat. Nos. 4,601,497 and 4,915,136 issued to Bartholomew.

All the foregoing devices have inherent limitations both in the security of their engagement systems, the complexity of their construction, and the reliability of their seals.

SUMMARY OF THE INVENTION

This invention is directed to the provision of an improved quick connect coupling.

More specifically, this invention is directed to the provision of a quick connect coupling having an improved sealing arrangement, having an improved coupling arrangement, and embodying a simple and improved methodology for constructing the coupling.

The invention coupling is of the type comprising a tubular male connector member including a front end pilot portion and an external annular bead defined at the rear end of the pilot portion; a first female connector member defining a capture bore sized to slidably receive the pilot portion, a seal counter bore positioned forwardly of the capture bore, and a further counterbore extending forwardly from the seal counterbore; an annular elastomeric seal positioned in the seal counterbore; and an second female connector member secured to the first female connector member.

According to the invention, the further counterbore defined by the first female connector member has a substantially constant diameter and cross-sectional configuration; and the second female connector member includes a main body annular portion having a substantially constant diameter and cross-sectional configuration corresponding generally to the diameter and cross-sectional configuration of the further counterbore and positioned telescopically and fixedly in the further counterbore, a plurality of resilient finger portions extending rearwardly and radially inwardly from the front end of the main body portion and defining free rearward ends for engagement with the rear annular face of the bead with the members in coupled relation, and seal retainer means extending radially inwardly from the rear end of the main body portion and defining a rear face coacting with the forward annular edge of the seal to maintain the seal in the seal counterbore and a front face seating against the front annular face of the bead with the members in coupled relation. This specific construction provides an effective and inexpensive coupling that is exceptionally resistant to leakage even in harsh duty.

According to a further feature of the invention, the main body portion of the second female connector member is fixedly secured in the further counterbore by fusion bonding. This specific bonding arrangement provides a ready and efficient means of constructing the invention coupling. In the disclosed embodiment of the invention the fusion bonding is accomplished by sonic welding.

According to a further feature of the invention, the further counterbore defines an internal annular shoulder with the seal counterbore and the main body portion of the second female connector member defines a rearward annular edge which is positioned proximate the internal annular shoulder. This specific construction positively locates the seal retainer means relative to the seal and relative to the male connector member bead.

According to a further feature of the invention, the seal comprises a single piece annular elastomeric member defining a series of axially spaced inwardly extending annular seal ribs sealingly and slidably engaging the pilot portion of the male member in response to insertion of the pilot portion into the front end of the female connector members. This specific seal construction defines a plurality of arcuate annular axial sealing surfaces around the pilot portion for maximum sealing effectiveness and precludes displacement or twisting of the several sealing surfaces by virtue of the unitary nature of the seal.

According to a further feature of the invention, the seal retainer means defines an opening sized to slidably receive the male member pilot portion. This specific construction enables the retainer means to firmly grasp the pilot portion so as to minimize cocking of the pilot portion relative to the seal. In the disclosed embodiment of the invention, the retainer means comprises a plurality of circumferentially spaced retainer feet portions extending radially inwardly from the rear end of the main body portion and the radially inner edges of the retainer feet portions are arcuate to correspond to the circular configuration of the outer diameter of the pilot portion.

According to a further feature of the invention, the further counterbore of the first female connector member is defined by a forward annular portion of the first female connector member, the forward annular portion defines an annular front edge, and the main body portion of the second female connector member includes an external annular flange at the forward end of the main body portion coacting with the annular front edge of the forward annular portion of the first female connector member to determine and limit the extent of telescopic insertion of the main body annular portion of the second female connector member into the forward annular portion of the first female connector member. This specific arrangement simplifies the assembling of the coupling and further rigidifies the coupling.

BRIEF DESCRIPTION OF THE DRAWINGS

FIG. 2 is an exploded perspective view of the invention coupling;

FIG. 3 is an exploded cross-sectional view of the invention coupling;

FIG. 4 is a cross-sectional view of a first female connector member utilized in the invention coupling;

FIG. 5 is a front end view of a second female connector member utilized in the invention coupling;

FIG. 6 is a cross-sectional view taken on line 5—5 of FIG. 4;

FIGS. 10 and 11 are progressive fragmentary views showing the assembly of the female connector members.

DETAILED DESCRIPTION OF THE PREFERRED EMBODIMENTS

Figure 1:
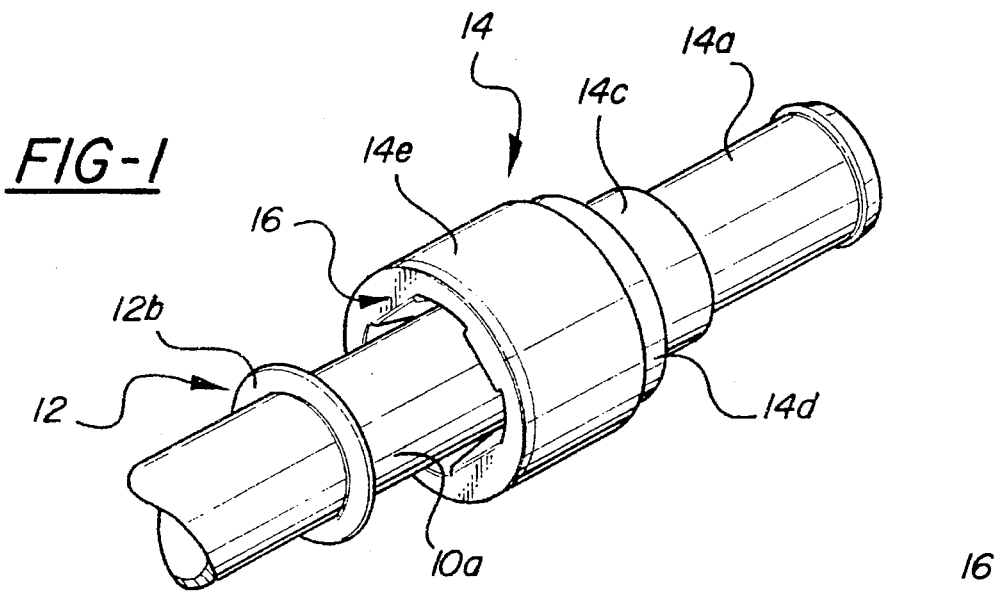
FIG. 1 is a perspective view of the invention quick connect coupling.
Figure 7:
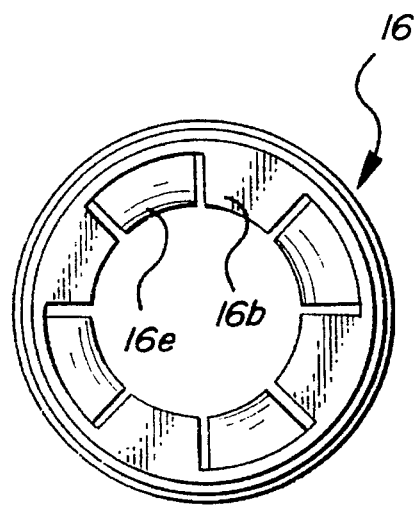
FIG. 7 is a rear end view of the second female connector member.
Figure 8:
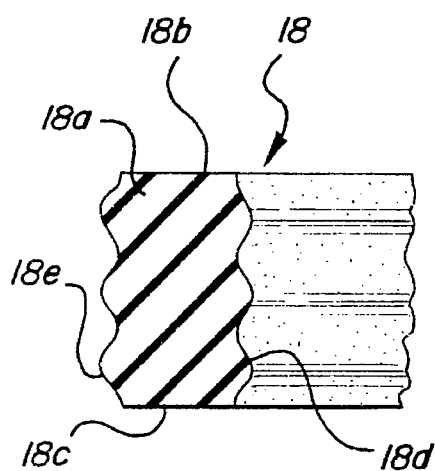
FIGS. 8 and 9 are fragmentary cross-sectional and end views of an elastomeric seal utilized in the invention coupling.
Figure 9:
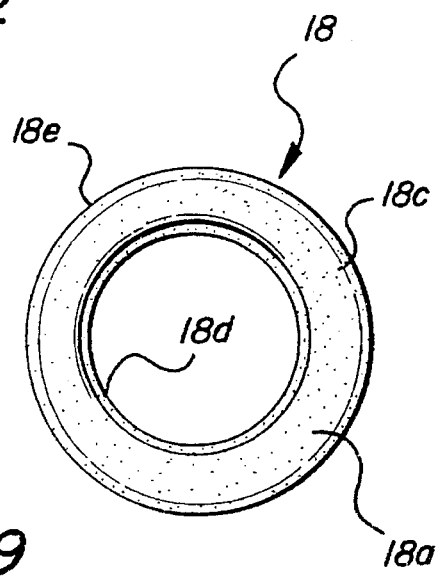

The invention quick connect coupling, broadly considered, includes a male connector member 10, a release member 12, a first or primary female connector member 14, a second or auxiliary female connector member 16, and a seal 18.

It will be understood that the first female connector member, the second female connector member, and the seal are assembled to form a female connector assembly, and the male and female connector members are operative in response to insertion of the male member into the female assembly to releasably connect the male member to the female assembly and form a continuous fluid passage through the coupling.

Male connector member 10 is formed of a suitable tubular material and includes a main body tubular portion 10a, a front end pilot portion 10c terminating in a tapered front edge 10d, and an annular external bead 10e constituting a latching or retaining means for the quick connect coupling.

Release member 12 includes a hub portion 12a sized to be slidably mounted on the male connector member main body portion 10a and a flange portion 12b extending radially outwardly from hub portion 12a.

First female connector member or housing 14 is formed of a suitable molded plastic material and includes a main body portion 14a, an enlarged capture bore portion 14c forwardly of the main body portion; a further enlarged seal bore portion 14d forwardly of the capture bore portion; and a yet further enlarged cylindrical socket portion 14e forwardly of the seal bore portion.

Main body portion 14a defines a main fluid passage 14f; capture bore portion 14c defines a capture counterbore 14g; seal bore portion 14d defines a seal counter bore 14h; and cylindrical socket portion 14e defines a cylindrical counter bore or socket 14i. The forward end of cylindrical portion 14e defines an annular forward edge surface 14j, a cylindrical surface 14k, and an annular conical surface 14l connecting cylindrical surface 14k and cylindrical bore 14i.

Second female connector member 16 is formed of a suitable molded plastic material and includes a main body cylindrical plug portion 16a, a plurality of circumferentially spaced feet portions 16b extending radially inwardly from the rear end 16c of the plug portion, an enlarged front flange portion 16d, and a plurality of circumferentially spaced resilient finger portions 16e extending in cantilever fashion rearwardly and radially inwardly from enlarged front flange portion 16d. Enlarged front flange portion 16d defines a circular edge portion 16f at the front end of the connector member, a cylindrical external surface 16g extending rearwardly from front edge 16f, a further external cylindrical surface 16h rearwardly of surface 16g, a circular shoulder 16i between surfaces 16g and 16h, and a further circular shoulder 16j between surface 16h and the exterior cylindrical surface 16k of main body cylindrical portion 16a. Feet portions 16b are circumferentially staggered with respect to finger portions 16e, so that a foot portion 16b is positioned between each two successive finger portions, and each finger portion 16e is circumferentially aligned with a groove 16l formed in the inner surface of main body portion 16a.

Seal 18 is formed of a suitable elastomeric material and includes a tubular main body portion 18a extending between a front annular edge 18b and a rear annular edge 18c; a series of internal annular axially spaced rib portions 18d defined on the interior of the main body portion; and a series of external annular axially spaced rib portions 18e defined on the exterior of the main body portion. The internal seal rib portions correspond in number to the external seal rib portions and each internal seal rib portion is respectively radially aligned with an external seal rib portion. The internal seal rib portions have a relaxed inner diameter slightly less than the diameter of the pilot portion 10c of the male connector member and the external seal rib portions have a relaxed outer diameter slightly greater than the diameter of the seal bore 14h.

To assemble the coupling, seal 18 is positioned in seal bore 14h with an interference fit provided by the enlarge diameter of the seal external rib portions 18e relative to the diameter of the seal bore; the cylindrical main body plug portion 16a of the second female connector member 16 is positioned snugly and telescopically within cylindrical socket bore 14i of the first female connector member 14 with the extent of insertion being limited and defined by engagement of the shoulder 16j on the second female connector member with the conical surface 14l on the first female connector member; a sonic gun 20 is positioned against flange portion 16f of the second female connector member proximate the abutting engagement of the shoulder 16j with the conical surface 14l; a force F is applied to the second female connector member as sonic energy is introduced into the assembled members proximate gun 20; and the sonic energy is continued and the force F is continued until sonic fusion occurs at the gap 22 between surfaces 16j and 14l with the result that the gap closes up and the second female connector member 16 moves axially inwardly relative to the first female connector member to form an annular sonic fusion weld at least at the annular interface 24 between the now juxtaposed surfaces 16j and 14l. This further axial movement of the second female connector member relative to the first female connector member also results in movement of the feet portions 16b of the second member into a position proximate but just short of engagement with the forward annular edge 18c of the seal, whereby to restrict forward movement of the seal out of the seal bore; movement of the annular end edge 16c of the second female connector member into a position proximate but just short of engagement with the annular shoulder 14m defined at the juncture of bores 14i and 14h; and movement of annular shoulder 16i into abutting engagement with annular end edge 14j. It will be seen that the telescopic movement of the cylindrical main body plug portion 16a into the cylindrical socket bore 14i is limited and defined by a combination of the engagement of shoulder 16i and edge 14j and the engagement of annular surfaces 16j and 14l.

The quick connect coupling is now ready for use to establish a leak-proof fluid connection between elements, such as hoses, respectively secured to the main body portion 10a of the male connector member and the main body portion 14a of the first female connector member. Specifically, the male and female connector members are releasably coupled together by inserting the pilot portion 10c of the male member into the open forward end of the female member assembly. As the annular external bead 10e engages the free ends 16m of the finger portions 16e, the fingers are biased radially and resiliently outwardly to allow passage of the bead. As the front edge 10d of the pilot portion 10c of the male member arrives at a position proximate but spaced from annular shoulder 14n, the front annular face 10f of the bead 10e seats against the front faces 16n of the feet portions 16b and the free ends 16m of the resilient finger portions snap into engagement with the rear annular face 10g of the bead so that the bead, and thereby the male connector member, is held firmly and positively between the finger portions and the feet portions of the second female connector member.

In this coupled relationship, the internal ribs 18d of the seal, which have been resiliently deformed in response to insertion of the pilot portion of the male member into the seal and into the capture bore, form a plurality of axially spaced wide area annular seals with the pilot portion, and the internal arcuate surfaces 16p of the feet portions coact to firmly and snugly engage the exterior peripheral surface of the pilot portion so as to minimize cocking of the pilot portion relative to the female connector member assembly and thereby minimize the potential disturbance to the seal that might be caused by such cocking. It will be seen that as the male member pilot portion is inserted into the seal 18, the unitary multi-rib construction of the seal acts to prevent twisting displacement or cutting of the seal such as often occurs with seals defined by a plurality of separate O-ring seal elements. The coupling may be released in known manner by sliding the release member 12 along the main body portion 10a of the male connector member so that the release member hub portion 12a forces finger portions 16e radially outwardly to a position clear of bead 10e whereafter the male and female members may be readily axially separated.

It will be seen that the invention provides a quick connect coupling having important advantages over the prior art. Specifically, the invention quick connect coupling provides a seal that is extremely effective and durable, that resists twisting or displacement or cutting, and that allows tailoring of the sealing characteristics and performance to suit a wide variety of sealing applications. Further, the invention coupling resists cocking of the male member relative to the female member so as to preserve the excellent sealing characteristics of the coupling even in severe duty environments. Further, the unique invention methodolog allows the formation of an effective coupling in a relatively inexpensive manner.

Whereas a preferred embodiment of the invention has been illustrated and described in detail, it will be apparent that various changes may be made in the disclosed embodiment without departing from the scope or spirit of the invention.

We claim:

1. A quick connect coupling comprising:

a tubular male connector member including a front end pilot portion and an external annular bead defined at the rear end of the pilot portion;

a first female connector member defining a capture bore sized to slidably receive the pilot portion, a seal counterbore positioned forwardly of the capture bore, and a further counter bore extending forwardly from the seal counter bore and having a substantially constant diameter and cross-sectional configuration; an annular elastomeric seal positioned in the seal counterbore and defining a forward annular edge; and a second female connector member including a main body annular portion having a substantially constant diameter and cross-sectional configuration corresponding generally to the diameter and cross-sectional configuration of the further counterbore and positioned telescopically and fixedly in said further counterbore, a plurality of resilient finger portions extending rearwardly and radially inwardly from the front end of the main body portion and defining free rearward ends for engagement with the rear annular face of the bead with the members in coupled relation, and seal retainer means extending radially inwardly from the rear end of the main body portion and defining a rear face coacting with the forward annular edge of the seal to maintain the seal in the seal counterbore and a front face seating against the front annular face of the bead with the members in coupled relation.

2. A quick connector coupler according to claim 1 wherein:

the further counter bore defines an internal annular shoulder with the seal counter bore; and the main body portion of the second female connector member defines a rearward annular edge which is positioned proximate the annular internal shoulder.

3. A coupling according to claim 1 wherein the main body portion of the second female connector member is fixedly secured in said further counterbore by fusion bonding.

4. A coupling according to claim 3 wherein the main body portion of the second female connector member is fixedly secured in said further counterbore by a sonic elding.

5. A coupling according to claim 1 wherein the seal comprises a single piece annular elastomeric member defining a series of axially spaced radially inwardly extending annular seal ribs sealingly and slidably engaging the pilot portion of the male connector member in response to insertion of the pilot portion into the front end of the female connector members.

6. A coupling according to claim 5 wherein the further counterbore of the first female connector member and the main body annular portion of the second female connector member have a circular cross-sectional configuration.

7. A coupling according to claim 5 wherein the seal retainer means defines an opening sized to slidably receive the male member pilot portion.

8. A coupling according to claim 7 wherein the seal retainer means comprises a plurality of circumferentially spaced retainer feet portions extending radially inwardly from the rear end of the main body portion.

9. A coupling according to claim 8 wherein the pilot portion is circular in cross section and the radially inner edges of the retainer feet portions are arcuate to correspond to the curvature of the outer diameter of the pilot portion.

10. A coupling according to claim 1 wherein the seal includes a tubular main body portion, a series of internal annular axially spaced rib portions defined on the interior of the main body portion for successive sealing coaction with the pilot portion as the pilot portion is inserted into the front end of the female connector members and into the capture bore, and a series of external annular axially spaced rib portions defined in the exterior of the main body portion for sealing coaction with the seal counterbore.

11. A connector assembly according to claim 10 wherein the external seal rib portions have a relaxed outer diameter slightly greater than the diameter of the seal counterbore so that the seal may be positioned in the seal counterbore with a frictional interference fit.

12. A connector assembly according to claim 10 wherein the internal seal rib portions correspond in number to the external seal rib portions.

13. A connector assembly according to claim 10 wherein the internal seal rib portions are respectively radially aligned with the external seal rib portions.

14. A connector assembly according to claim 13 wherein the internal seal rib portions have a relaxed inert diameter slightly less than the diameter of the pilot portion of the male connector member so that the internal rib portions deformably, sealingly, and successively engage the pilot portion as the male connector member is inserted into the seal.

15. A quick connect coupling comprising:
   a tubular male connector member including a front end pilot portion and an external annular bead defined at the rear end of the pilot portion;
   a first female connector member defining a capture bore sized to slidably receive the pilot portion of the tubular male connector member, a seal counterbore positioned forwardly of the capture bore, and a forward annular portion defining a cylindrical counterbore extending forwardly of the seal counterbore;
   an annular elastomeric seal positioned in the seal counterbore, having an axial length approximating the axial length of the seal counterbore, and defining a forward annular edge proximate the forward end of the seal counterbore; and
   a second female connector member fixedly secured to the first female connector member and including a cylindrical main body portion positioned telescopically and snugly within the forward annular portion of the first female connector member with its cylindrical outer surface substantially contiguous with the cylindrical counterbore, retainer lip means extending radially inwardly from the rearward edge of the main body portion and defining a rear face means coacting with the forward annular edge of the seal to retain the seal in the seal counterbore, and front face means seating against the front annular face of the male connector member bead with the members in coupled relation, and a plurality of circumferentially spaced resilient finger portions extending rearwardly and radially inwardly from the front end of the main body portion and latchingly coacting at their free rearward ends with the rear annular face of the bead with the members in coupled relation.

16. A coupling according to claim 15 wherein the seal comprises a single piece annular elastomeric member defining a series of axially spaced radially inwardly extending annular seal ribs sealingly and slidably engaging the pilot portion in response to insertion of the pilot portion into the front end of the first female connector member.

17. A coupling according to claim 15 wherein the retainer lip means defines an opening sized to slidably receive the male member pilot portion.

18. A coupling according to claim 17 wherein the retainer lip means comprises a plurality of circumferentially spaced retainer feet portions extending radially inwardly from the rear end of the main body portion.

19. A coupling according to claim 18 wherein the pilot portion is circular in cross-section and the radially inner edges of the retainer feet portions are arcuate to correspond to the curvature of the outer diameter of the pilot portion.

20. A coupling according to claim 18 wherein the retainer feet portions are circumferentially staggered with respect to the resilient finger portions so that a retainer foot portion is aligned circumferentially between each successive pair of resilient finger portions.

21. A coupling according to claim 15 wherein the seal includes a tubular main body portion, a series of internal annular axially spaced rib portions defined on the interior of the main body portion for successive sealing coaction with the pilot portion as the pilot portion is inserted into the front end of the female connector members and into the capture bore, and a series of external annular axially spaced rib portions defined on the exterior of the main body portion for sealing coaction with the seal counterbore.

22. A connector assembly according to claim 21 wherein the external seal rib portions have a relaxed outer diameter slightly greater than the diameter of the seal counterbore so that the seal may be positioned in the seal counterbore with a frictional interference fit.

23. A connector assembly according to claim 21 wherein the internal seal rib portions correspond in number to the external seal rib portions.

24. A connector assembly according to claim 23 wherein the internal seal rib portions are respectively radially aligned with the external seal rib portions.

25. A connector assembly according to claim 24 wherein the internal seal rib portions have a relaxed inner diameter slightly less than the diameter of the pilot portion of the male connector member so that the internal rib portions deformably, sealingly, and successively engage the pilot portion as the male connector member is inserted into the seal.

26. A coupling according to claim 15 wherein the cylindrical main body portion of the second female connector member is fusion bonded to the forward annular portion of the first female connector member.

27. A coupling according to claim 26 wherein the main body portion of the second female connector member is bonded to the forward annular portion of the first female connector member by sonic welding.

28. A coupling according to claim 26 wherein the forward annular portion of the first female connector member defines an annular front edge and the cylindrical main body portion of the second female connector member includes an external annular flange at the forward end of the main body portion coacting with the annular front edge of the front annular portion of the first female connector member to determine and limit the extent of telescopic insertion of the cylindrical main body portion of the second female connector member into the front annular portion of the first female connector member.

* * * * *